United States Patent
Hirao et al.

(10) Patent No.: US 10,059,344 B2
(45) Date of Patent: Aug. 28, 2018

(54) VEHICLE BEHAVIOR CONTROL APPARATUS

(71) Applicant: HITACHI AUTOMOTIVE SYSTEMS, LTD., Ibaraki (JP)

(72) Inventors: Ryusuke Hirao, Kamagaya (JP); Nobuyuki Ichimaru, Yokohama (JP); Yasuhiro Aoki, Yokohama (JP); Makoto Yamakado, Tsuchiura (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/469,048

(22) Filed: Aug. 26, 2014

(65) Prior Publication Data

US 2015/0066243 A1 Mar. 5, 2015

(30) Foreign Application Priority Data

Aug. 30, 2013 (JP) .................................. 2013-180402

(51) Int. Cl.
*B60G 17/016* (2006.01)
*B60G 17/018* (2006.01)
(Continued)

(52) U.S. Cl.
CPC ............ *B60W 40/13* (2013.01); *B60W 10/22* (2013.01); *B60W 30/045* (2013.01); *B60W 2710/223* (2013.01); *B60W 2710/226* (2013.01)

(58) Field of Classification Search
CPC .... B60W 40/13; B60W 30/045; B60W 10/22; B60W 2710/226; B60W 2710/223
See application file for complete search history.

(56) References Cited

U.S. PATENT DOCUMENTS 3,007,712 A * 11/1961 Moulton ................ B60G 11/30
267/64.19
4,834,418 A * 5/1989 Buma ................ B60G 17/0155
280/124.104
(Continued)

FOREIGN PATENT DOCUMENTS

JP 04-100724 4/1992
JP 08-207542 8/1996
(Continued)

OTHER PUBLICATIONS

Suzuki et al, Driving/Braking Force Distribution of Four Wheel Vehicle by Quadratic Programming with Constraints, IEEE Conference on Decision and Control, Dec. 15-17, 2010.*
(Continued)

*Primary Examiner* — Alan D Hutchinson
(74) *Attorney, Agent, or Firm* — Wenderoth, Lind & Ponack, L.L.P.

(57) ABSTRACT

A tire load calculation section of a controller calculates tire load factors of the respective wheels. A target tire load-factor calculation section calculates a tire load factor average value ($\eta_{ave}$) obtained by averaging the tire load factors ($\eta_i$) of the respective wheels as a target tire load factor. A target tire vertical-load calculation section calculates target tire vertical loads ($Fzref_i$) for the respective wheels so that the tire load factors of the respective wheels become equal to the tire load factor average value. A vertical-load control section and a suspension control section control thrusts of electromagnetic dampers for the respective wheels so as to achieve the target tire vertical loads.

13 Claims, 13 Drawing Sheets

(51) Int. Cl.
*B60W 40/10* (2012.01)
*B60W 40/13* (2012.01)
*B60W 10/22* (2006.01)
*B60W 30/045* (2012.01)

(56) References Cited

U.S. PATENT DOCUMENTS

| | | | | |
|---|---|---|---|---|
| 5,322,321 | A * | 6/1994 | Yopp | B60G 15/08 |
| | | | | 280/5.514 |
| 5,374,077 | A * | 12/1994 | Penzotti | B60G 11/30 |
| | | | | 267/123 |
| 6,419,240 | B1 * | 7/2002 | Burdock | B60G 17/0162 |
| | | | | 280/124.106 |
| 6,984,003 | B2 * | 1/2006 | Kogure | B60G 17/0162 |
| | | | | 303/146 |
| 8,150,613 | B2 * | 4/2012 | Engelhard | B60W 40/13 |
| | | | | 180/290 |
| 2006/0071441 | A1 * | 4/2006 | Mathis | B60G 7/001 |
| | | | | 280/124.128 |
| 2012/0029770 | A1 | 2/2012 | Hirao et al. | |
| 2012/0078470 | A1 | 3/2012 | Hirao et al. | |

FOREIGN PATENT DOCUMENTS

| | | |
|---|---|---|
| JP | 2008-247064 | 10/2008 |
| JP | 2008247064 A * | 10/2008 |
| JP | 2012-46172 | 3/2012 |
| JP | 2012-71630 | 4/2012 |

OTHER PUBLICATIONS

Machine Translation of JP 2008247064 A, printed May 18, 2017.*
Notice of Reason for Rejection dated Feb. 21, 2017 in Japanese Patent Application No. 2013-180402.

* cited by examiner

WHEN ENTERING CURVE
(LATERAL FORCE ON FRONT WHEELS>
LATERAL FORCE ON REAR WHEELS)

WHEN EXITING CURVE
(LATERAL FORCE ON FRONT WHEELS<
LATERAL FORCE ON REAR WHEELS)

WHEN ENTERING CURVE
(LATERAL FORCE ON FRONT WHEELS >
LATERAL FORCE ON REAR WHEELS)

WHEN EXITING CURVE
(LATERAL FORCE ON FRONT WHEELS <
LATERAL FORCE ON REAR WHEELS)

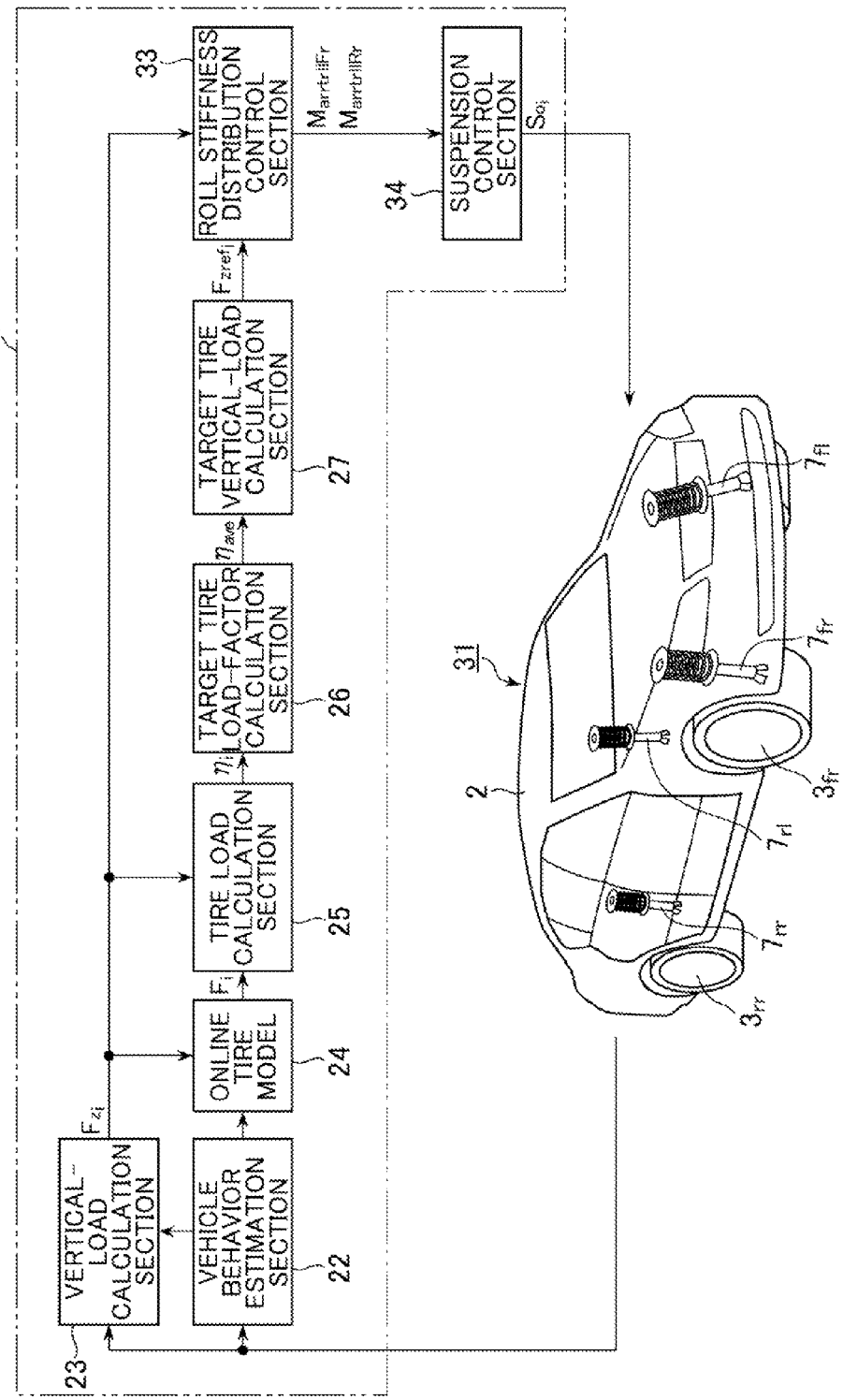

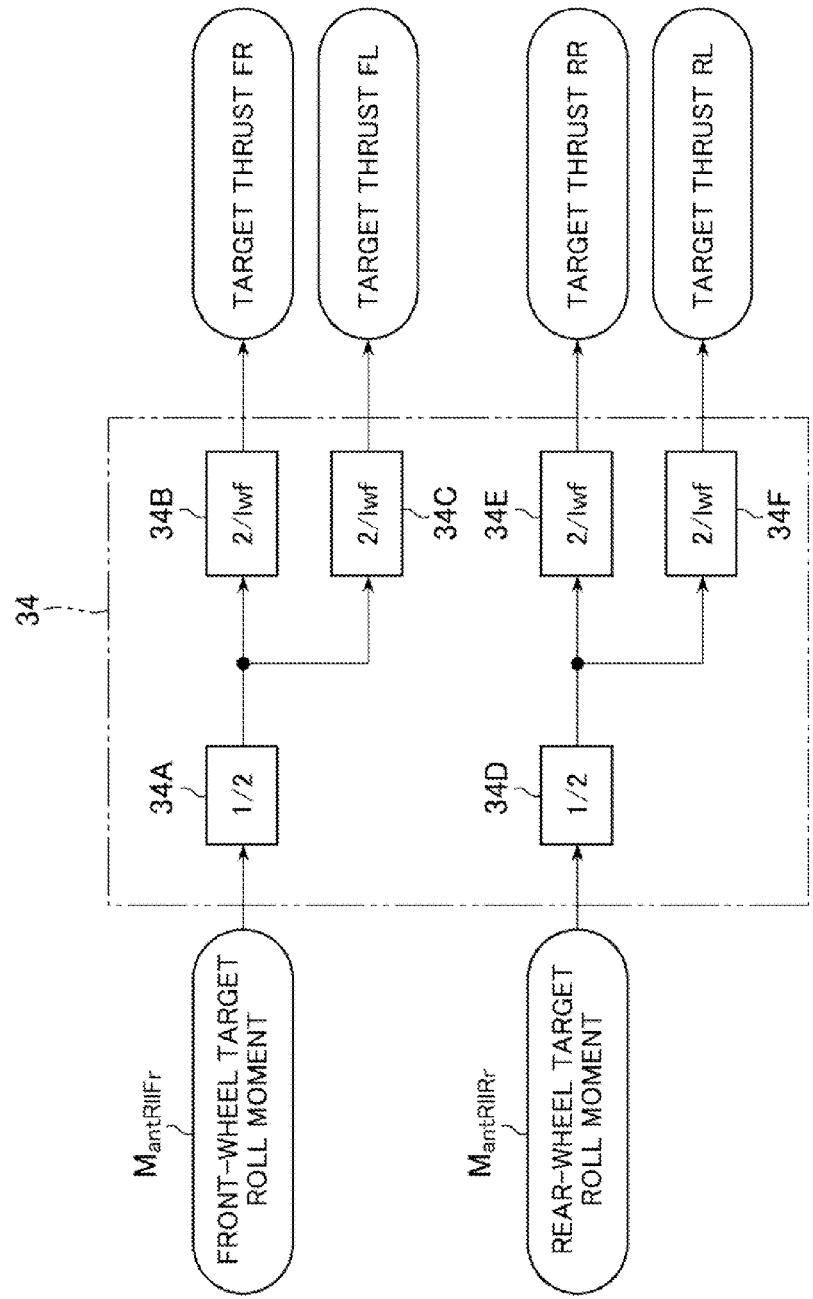

WHEN ENTERING CURVE
(LATERAL FORCE ON FRONT WHEELS >
LATERAL FORCE ON REAR WHEELS)

WHEN EXITING CURVE
(LATERAL FORCE ON FRONT WHEELS <
LATERAL FORCE ON REAR WHEELS)

WHEN ENTERING CURVE
(LATERAL FORCE ON FRONT WHEELS >
LATERAL FORCE ON REAR WHEELS)

WHEN EXITING CURVE
(LATERAL FORCE ON FRONT WHEELS <
LATERAL FORCE ON REAR WHEELS)

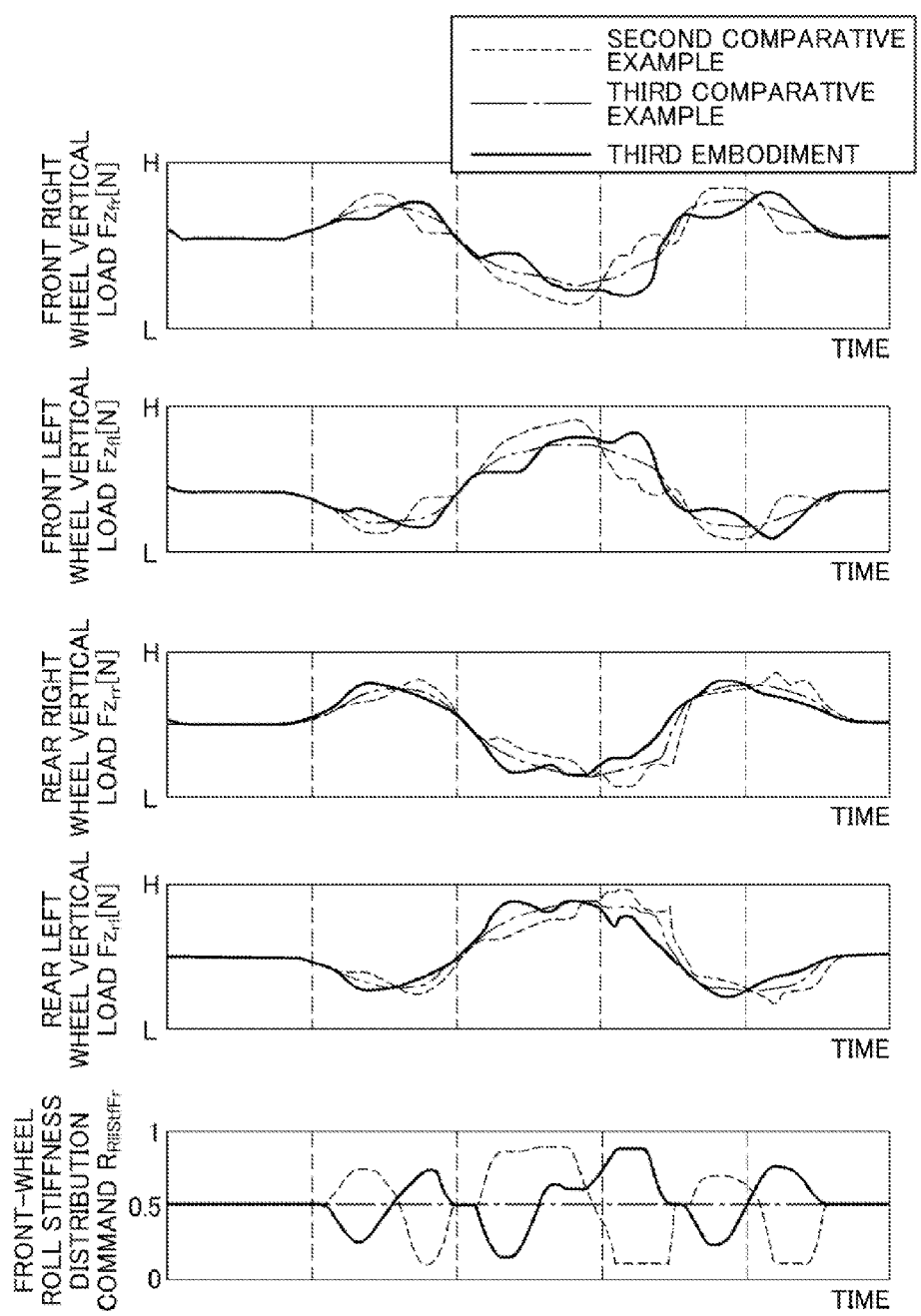

VEHICLE BEHAVIOR CONTROL APPARATUS

BACKGROUND OF THE INVENTION

1. Technical Field

The present invention relates to a vehicle behavior control apparatus suitably used for a vehicle, for example, a four-wheel automobile.

2. Description of the Related Art

There is generally known a vehicle behavior control apparatus capable of improving vehicle drive performance by switching damping forces of suspensions (dampers) respectively on a front right wheel side, a front left wheel side, a rear right wheel side, and a rear left wheel side (see, for example, Japanese Patent Application Laid-open Nos. 2012-46172 and 2012-71630).

Japanese Patent Application Laid-open No. 2012-46172 discloses the following configuration. Specifically, in order to improve a steering feel, the damping-force characteristics of each of the dampers are controlled so that a pitch rate and a roll rate while the vehicle is turning have a proportional relationship.

Japanese Patent Application Laid-open No. 2012-71630 discloses the following configuration. Specifically, in order to improve roll feeling and stability in accordance with running conditions of the vehicle, the damping-force characteristics of each of the dampers are controlled so that the pitch rate becomes equal to a target pitch rate in accordance with the roll rate while tires of the vehicle in a running state are present within a normal region, whereas the damping-force characteristics of each of the dampers are controlled so as to increase a control amount for suppressing the roll while the tires are present within a limit region in which tires' grip on a road surface is poor.

The related art in Japanese Patent Application Laid-open Nos. 2012-46172 and 2012-71630 described above relates to the control based on the improvement of the roll feeling at the time of steering and the suppression of roll when the tires of the vehicle in a running state are present within the limit region. Therefore, steering stability is sometimes insufficient when the vehicle is running at the limit.

SUMMARY OF THE INVENTION

The present invention has an object of providing a vehicle behavior control apparatus capable of improving steering stability of a vehicle.

In order to achieve the above-mentioned object, according to one embodiment of the present invention, there is provided a vehicle behavior control apparatus for controlling a behavior of a vehicle including a plurality of wheels having respective tires externally mounted thereon. The vehicle behavior control apparatus includes: means for estimating a degree of allowance for generation of a lateral force on a front wheel and on a rear wheel; vehicle behavior estimation means for estimating the behavior of the vehicle; tire load calculation means for calculating tire load factors of the respective tires; and vertical-load control means for controlling, when the vehicle behavior estimation means estimates that the vehicle is in a turning state, a load applied to a wheel other than a wheel having a larger tire load factor among calculated values of the respective tire load factors calculated by the tire load calculation means, so as to increase a load applied to the wheel having the larger tire load factor.

According to one embodiment of the present invention, the steering stability of the vehicle can be improved.

BRIEF DESCRIPTION OF THE DRAWINGS

FIG. 4A illustrates the relationship at the time of entering a curve and FIG. 4B illustrates the relationship at the time of exiting the curve.

FIG. 5A illustrates the relationship at the time of entering the curve and FIG. 5B illustrates the relationship at the time of exiting the curve.

FIG. 6 is a control block diagram illustrating a vehicle behavior control apparatus according to a second embodiment of the present invention.

FIG. 7 is a block diagram illustrating a configuration of a suspension control section illustrated in FIG. 6.

FIG. 8A illustrates the relationship at the time of entering the curve and FIG. 8B illustrates the relationship at the time of exiting the curve.

FIG. 9A illustrates the relationship at the time of entering the curve and FIG. 9B illustrates the relationship at the time of exiting the curve.

FIG. 13 is a characteristic diagram illustrating temporal changes in vertical loads on the respective wheels and front-wheel roll stiffness distribution command.

DETAILED DESCRIPTION OF THE INVENTION

Now, a vehicle behavior control apparatus according to each embodiment of the present invention is described in detail referring to the accompanying drawings, taking a case where the vehicle behavior control apparatus is used for, for example, a four-wheel automobile as an example.

In order to avoid complication of the description, a subscript i indicating front right (fr), front left (fl), rear right (rr), or rear left (rl) is added to the reference symbols in the description. For collectively denoting the front right, the front left, the rear right, and the rear left, the subscript i is directly added to the reference symbols in the description.

Figure 1:
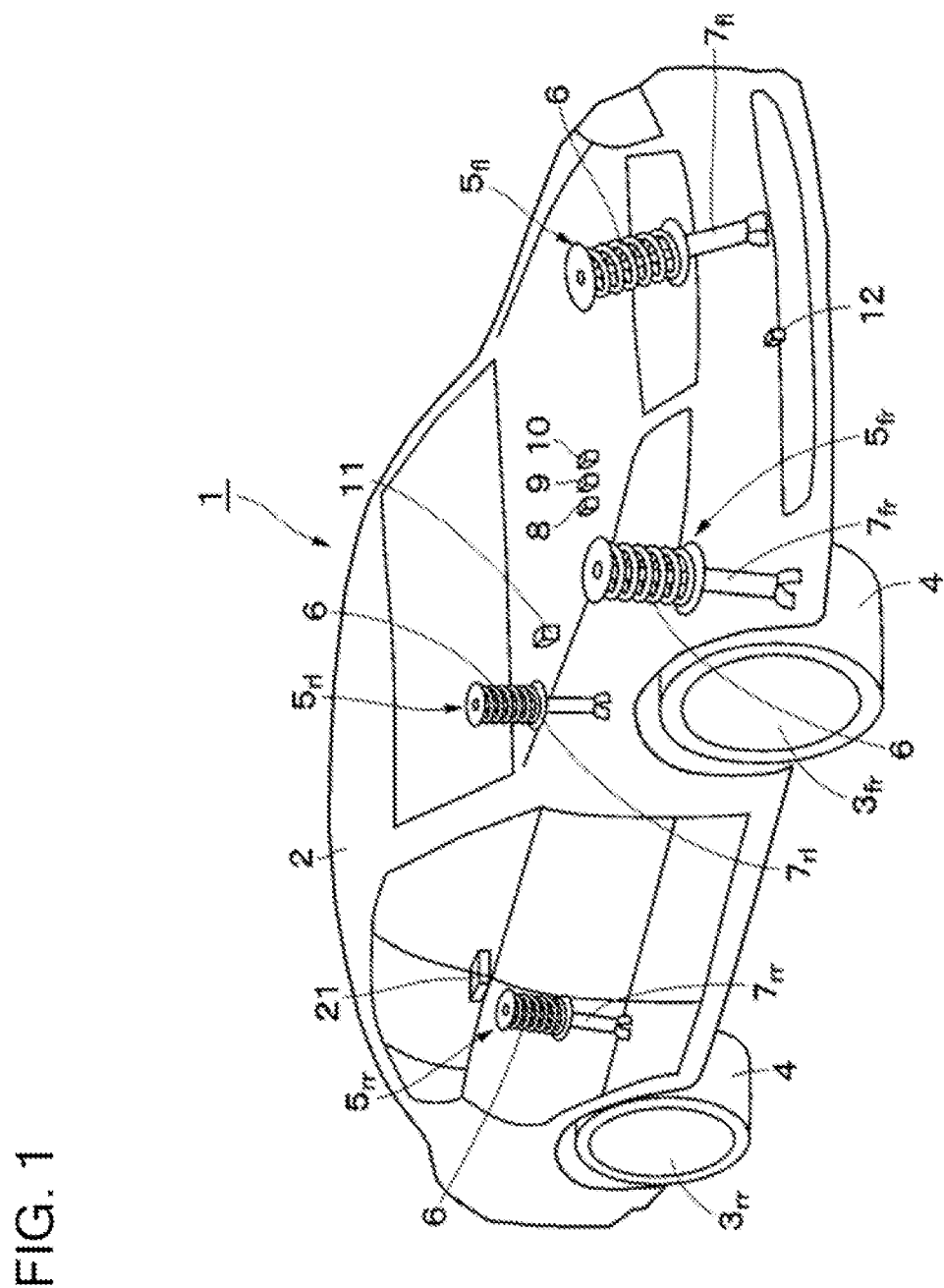
FIG. 1 is a perspective view of a four-wheel automobile to which a vehicle behavior control apparatus according to a first embodiment of the present invention is applied.
Figure 2:
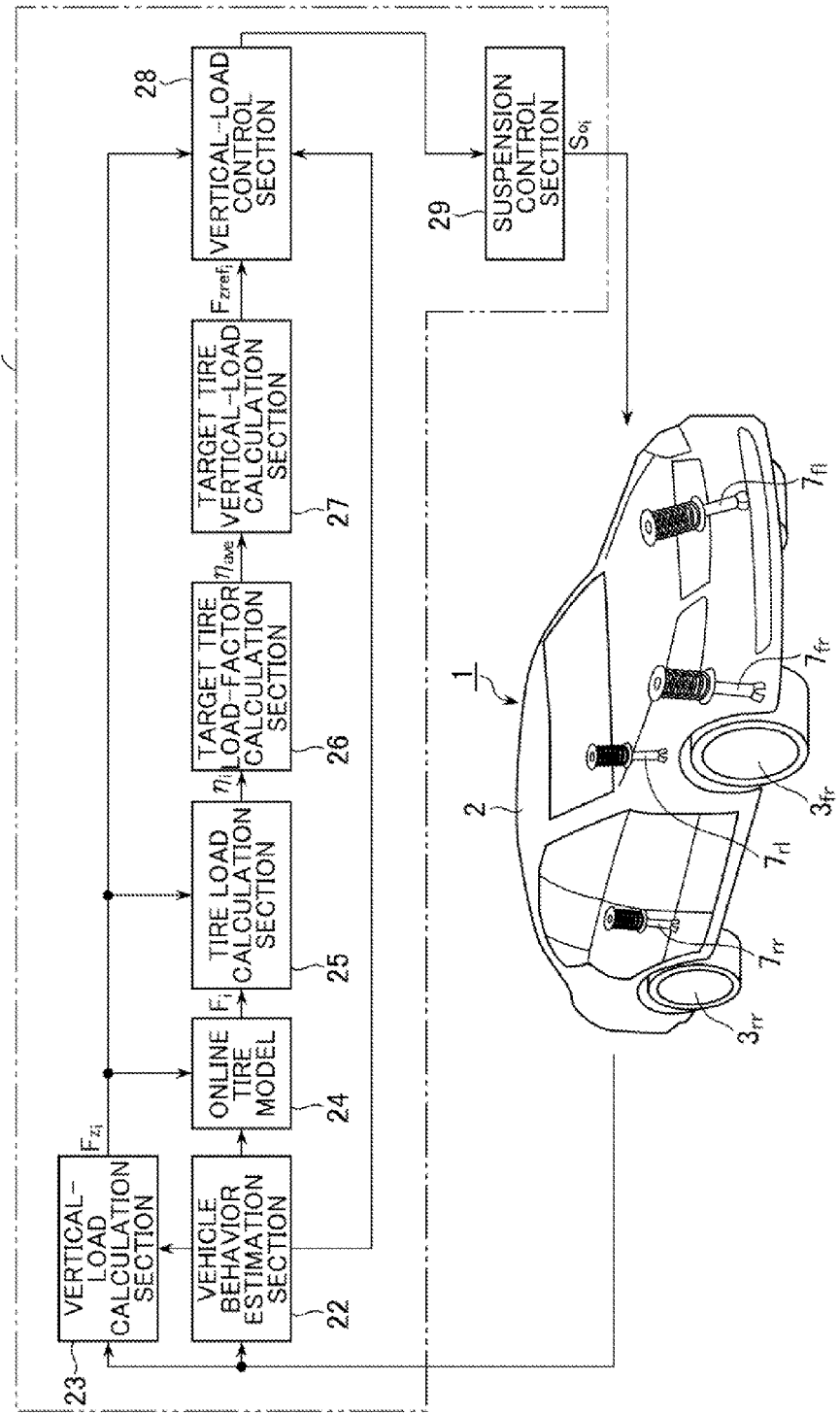
FIG. 2 is a control block diagram illustrating the vehicle behavior control apparatus according to the first embodiment.

FIGS. 1 and 2 illustrate a first embodiment of the present invention. As illustrated in FIGS. 1 and 2, a vehicle 1 includes a vehicle body 2, wheels $3_i$, suspension devices $5_i$, a yaw-rate sensor 8, a longitudinal acceleration sensor 9, a lateral acceleration sensor 10, a steering-angle sensor 11, a vehicle-velocity sensor 12, and a controller 21.

The vehicle body 2 constitutes a body of the vehicle 1. On a lower side of the vehicle body 2, front right (fr), front left (fl), rear right (rr), and rear left (rl) wheels $3_i$ (a front right wheel $3_{fr}$, a front left wheel $3_{fl}$, a rear right wheel $3_{rr}$, and a rear left wheel $3_{rl}$) are provided. Tires 4 are externally mounted on the wheels $3_i$, respectively.

The suspension devices $5_i$ are provided between the vehicle body 2 and the respective wheels $3_i$. Each of the suspension devices $5_i$ includes a suspension spring 6 (hereinafter also referred to simply as "spring 6") and an electromagnetic damper $7_i$. The electromagnetic damper $7_i$ is provided as a control damper which is provided between the vehicle body 2 and the wheel $3_i$ in parallel to the spring 6. The electromagnetic damper $7_i$ constitutes an active suspension device and has a function of damping vertical movement of each of the wheels. Therefore, each of the electromagnetic dampers $7_i$ generates a thrust for moving up and down the vehicle body 2 on each wheel $3_i$ side in accordance with a control signal (command signal $So_i$) from the controller 21.

The yaw-rate sensor 8 is, for example, a gyro sensor and is provided to the vehicle body 2. The yaw-rate sensor 8 detects a speed change of a rotation angle in a turning direction, which is generated about a center of gravity of the vehicle 2, specifically, a yaw rate indicating a yawing behavior of the vehicle 1. The yaw-rate sensor 8 outputs its detection signal to the controller 21. The yaw-rate sensor 8 is not required to be the gyro sensor. The yaw-rate sensor 8 may also calculate or estimate the yaw rate from data output from other sensors.

The longitudinal acceleration sensor 9 is provided to the vehicle body 2 and detects an acceleration in a longitudinal direction acting on the vehicle 1, specifically, a longitudinal acceleration indicating a pitching behavior of the vehicle 1. The longitudinal acceleration sensor 9 outputs its detection signal to the controller 21.

The lateral acceleration sensor 10 is provided to the vehicle body 2 and detects an acceleration in a horizontal direction (lateral direction) acting on the vehicle 1, specifically, a lateral acceleration Ay indicating a roll behavior of the vehicle 1. The lateral acceleration sensor 10 outputs its detection signal to the controller 21. The lateral acceleration Ay increases not only when the vehicle 1 is in a turning state but also when crosswind is generated. Therefore, the lateral acceleration sensor 10 can also detect a disturbance such as crosswind.

The steering-angle sensor 11 is provided to the vehicle body 2 and detects a steering angle when a driver of the vehicle 1 steers a steering wheel to turn. The steering-angle sensor 11 outputs its detection signal to the controller 21.

The vehicle-velocity sensor 12 is provided to the vehicle body 2 and detects a running velocity of the vehicle 1 to output its detection signal to the controller 21.

The controller 21 is, for example, a microcomputer or the like. An input side of the controller 21 is connected to the yaw-rate sensor 8, the longitudinal acceleration sensor 9, the lateral acceleration sensor 10, the steering-angle sensor 11, and the vehicle-velocity sensor 12, whereas an output side thereof is connected to actuators (not shown) for the electromagnetic dampers $7_i$.

As illustrated in FIG. 2, the controller 21 includes a vehicle behavior estimation section 22, a vertical-load calculation section 23, an online tire model 24, a tire load calculation section 25, a target tire load-factor calculation section 26, a target tire vertical-load calculation section 27, a vertical-load control section 28, and a suspension control section 29.

The vehicle behavior estimation section 22 constitutes vehicle behavior estimation means for estimating a behavior of the vehicle 1. The vehicle behavior estimation section 22 estimates, based on the detection signals from the sensors 8 to 12, a vehicle behavior which is necessary to estimate tire forces $F_i$. Specifically, the vehicle behavior estimation section 22 estimates and outputs a vehicle-body sideslip angle, a road-surface friction coefficient μ, a tire sideslip angle of each of the wheels, and a slip ratio as the vehicle behavior.

The vertical-load calculation section 23 calculates a vertical load $Fz_i$ on each of the wheels based on the longitudinal acceleration, the lateral acceleration Ay, etc., of the vehicle 1. Specifically, the vertical-load calculation section 23 calculates the vertical load $Fz_i$ on each of the wheels based on, for example, a vertical load on each of the wheels in a stationary state, a gravitational acceleration, a height of gravitational center of the vehicle, a wheel base, and a tread in addition to the longitudinal acceleration and the lateral acceleration Ay of the vehicle 1.

For calculating the vertical load $Fz_i$ on each of the wheels, the vehicle-body sideslip angle, the road-surface friction coefficient μ, the tire sideslip angle of each of the wheels, and the slip ratio, which are estimated by the vehicle behavior estimation section 22, may be used.

Figure 3:
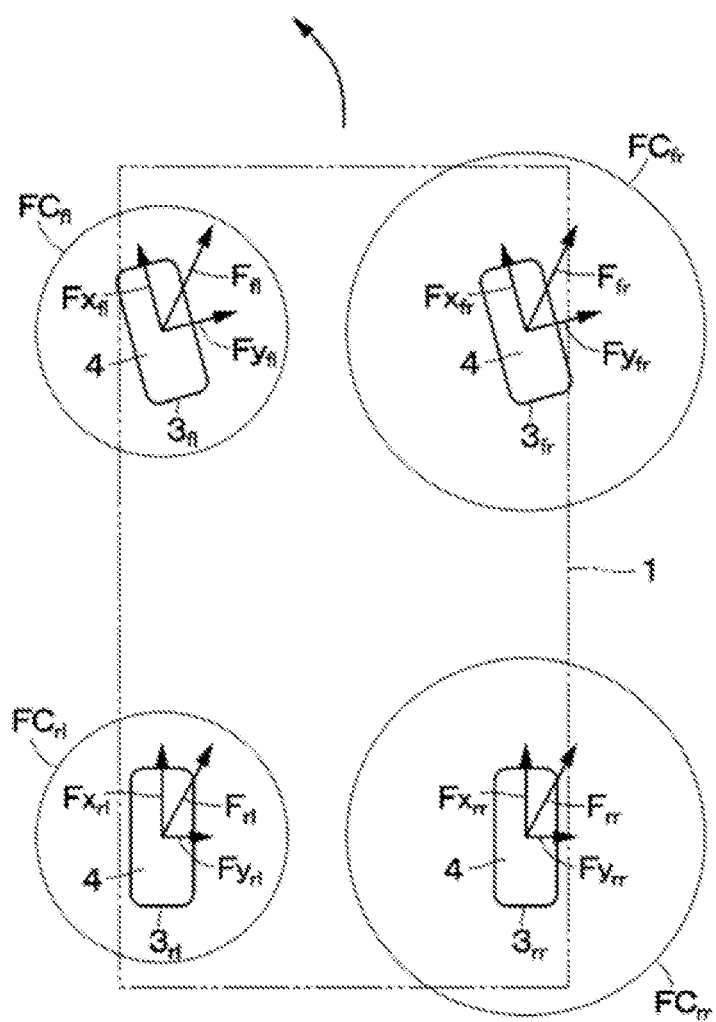
FIG. 3 is an explanatory view illustrating the relationship between tire forces and friction circles at the time of turning left.

The online tire model 24 calculates the tire force $F_i$ as a force generated by corresponding one of the tires 4 based on the calculated tire sideslip angle of the corresponding one of the wheels, the slip ratio, the vertical load $Fz_i$, and the road-surface friction coefficient μ. As illustrated in FIG. 3, the tire force $F_i$ is represented by a resultant force of a tire longitudinal force $Fx_i$ along a longitudinal direction of the tire 4 and a tire lateral force $Fy_i$ along a lateral direction (width direction) of the tire 4. Therefore, the online tire model 24 outputs the tire longitudinal force $Fx_i$ and the tire lateral force $Fy_i$ of each of the wheels. In this case, the tire force Fi does not exceed a maximum friction force ($\mu Fz_i$). Therefore, the tire force $F_i$ falls within the range of a friction circle $FC_i$ having the maximum friction force ($\mu Fz_i$) as a radius.

The tire load calculation section 25 constitutes tire load calculation means for calculating tire load factors $\eta_i$ of the respective tires 4. The tire load calculation section 25 substitutes the tire longitudinal force $Fx_i$ and the tire lateral force $Fy_i$ of each of the wheels, the vertical load $Fz_i$ on each of the wheels, and the road-surface friction coefficient μ between each of the tires 4 and the road surface into Expression 1, to thereby calculate the tire load factor $\eta_i$ of each of the wheels. In this case, the tire load factor $\eta_i$ indicates a ratio of the tire force $F_i$ to the maximum friction force ($\mu Fz_i$).

$$\eta_i = \frac{\sqrt{Fx_i^2 + Fy_i^2}}{\mu\, Fz_i} \tag{1}$$

The target tire load-factor calculation section 26 constitutes vertical-load control means together with the target tire vertical-load calculation section 27, the vertical-load control section 28, and the suspension control section 29. The target tire load-factor calculation section 26 calculates a tire load factor average value $\eta_{ave}$ obtained by averaging the tire load factors $\eta_i$ of the respective wheels based on Expression 2.

$$\eta_{ave} = \frac{\sum_i \eta_i}{4} = \frac{\eta_{fr} + \eta_{fl} + \eta_{rr} + \eta_{rl}}{4} \qquad (2)$$

The target tire vertical-load calculation section 27 calculates a target tire vertical load $Fzref_i$ on each of the wheels by using the calculated tire load factor average value $\eta_{ave}$ as a target tire load factor based on Expression 3.

$$Fzref_i = \frac{\sqrt{Fx_i^2 + Fy_i^2}}{\mu \, \eta_{ave}} \qquad (3)$$

The vertical-load control section 28 calculates target thrusts for the electromagnetics damper $7_i$ of the respective wheels so as to achieve the target tire vertical loads $Fzref_i$. The suspension control section 29 calculates command values in accordance with the target thrusts for the respective wheels and outputs the command signals $So_i$ such as the currents in accordance with the calculated command values to the actuators for the electromagnetic dampers $7_i$.

Although the vertical load $Fz_i$ has been described as being calculated by the vertical-load calculation section 23, the vertical load $Fz_i$ may also be detected by, for example, a vertical-load detection section including various sensors. In this case, the vertical-load detection section may be a displacement sensor or a strain sensor mounted to each of the wheels or a suspension of each of the wheels.

Moreover, although the tire longitudinal forces $Fx_i$ and the tire lateral forces $Fy_i$ are calculated by using the online tire model 24, the tire longitudinal forces $Fx_i$ and the tire lateral forces $Fy_i$ may also be detected by, for example, a tire-force sensor or known means. Thus, a calculation method is not particularly required to be limited. Further, the online tire model 24 may correct the tire characteristics based on, for example, a tire pressure.

The vehicle behavior control apparatus according to the first embodiment has the configuration described above. Next, an operation of vehicle behavior control performed by the controller 21 is described in comparison with a first comparative example where hydraulic dampers which are not controlled externally are mounted in place of the electromagnetic dampers $7_i$.

Figure 4A:
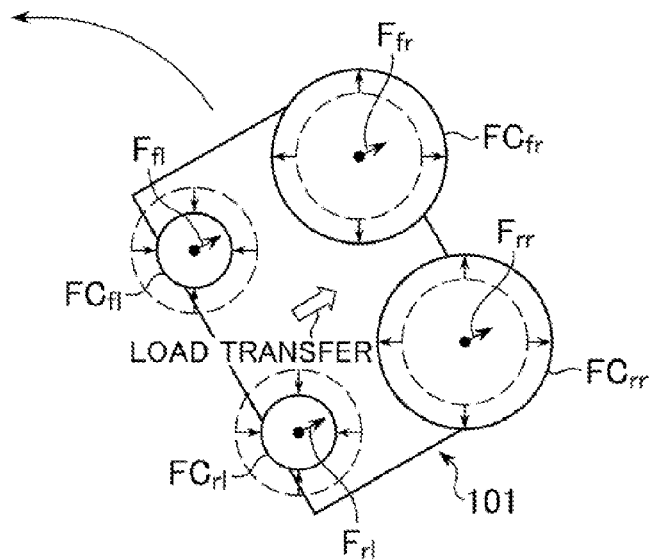
FIGS. 4A and 4B are explanatory views illustrating the relationship between the tire forces and the friction circles according to a first comparative example, where
Figure 4B:
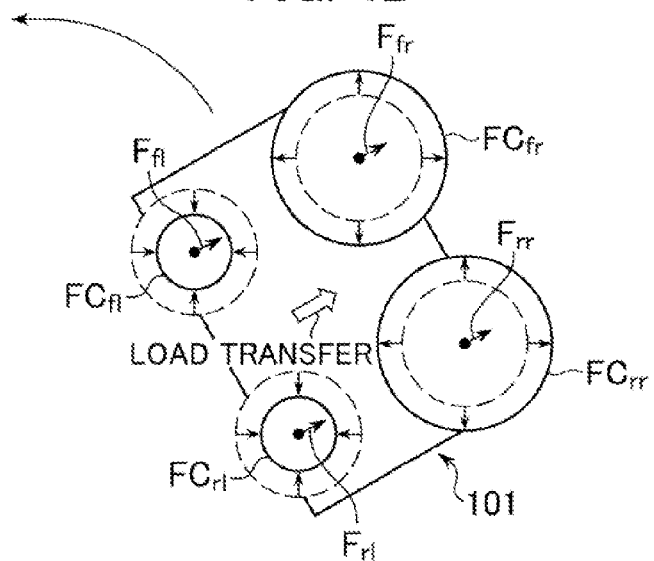

FIG. 4A illustrates a state in which a vehicle 101 according to the first comparative example enters a curve (at the time of entering a turn), whereas FIG. 4B illustrates a state in which the vehicle 101 according to the first comparative example exits the curve (at the time of exiting the turn). As illustrated in FIGS. 4A and 4B, when the vehicle 101 is turning, the load transfers from the inside of the turn to the outside of the turn under the effects of an inertia force. As a result, the loads on the wheels on the outside of the turn increase, whereas the loads on the wheels on the inside of the turn decrease. For example, when the vehicle 101 is turning left, the vertical load $Fz_{fr}$ on the front right wheel $3_{fr}$ and the vertical load $Fz_{rr}$ on the rear right wheel $3_{rr}$ increase, whereas the vertical load $Fz_{fl}$ on the front left wheel $3_{fl}$ and the vertical load $Fz_{rl}$ on the rear left wheel $3_{rl}$ decrease. As a result, the left wheels $3_{fl}$ and $3_{rl}$ on which the vertical loads $Fz_{fl}$ and $Fz_{rl}$ decrease have larger tire load factors $\eta_{fl}$ and $\eta_{rl}$, respectively. The tire forces $F_i$ of the wheels $3_{fl}$ and $3_{rl}$ respectively having the larger tire load factors $\eta_{fl}$ and $\eta_{rl}$ tend to exceed the maximum friction forces ($\mu Fz_i$). Thus, a slip occurs to prevent the tire forces $F_i$ from being effectively used. As a result, steering stability is sometimes lowered.

The case where the steering stability is lowered as described above is analyzed. Then, it is found that the tire force $F_i$ is saturated by the friction circle $FC_i$ in such a case. In this case, the tire forces $F_i$ of the four wheels are not all saturated. Instead, the tires on the side where the vertical load $Fz_i$ increases due to the load transfer caused by turning, acceleration, or deceleration often have the smaller tire load factors $\eta_i$.

The present invention has been made based on the knowledge described above. The steering stability is improved by efficiently using the tire forces $F_i$ of the four wheels. Specifically, focusing on the tire load factors $\eta_i$, the loads (vertical loads $Fz_i$) are controlled so as to equalize the tire load factors $\eta_i$ of the respective wheels. More specifically, the suspension devices $5_i$ are controlled so that the load is decreased for the wheel having the smaller tire load factor $\eta_i$, whereas the load is increased for the wheel having the larger tire load factor $\eta_i$.

Figure 5A:
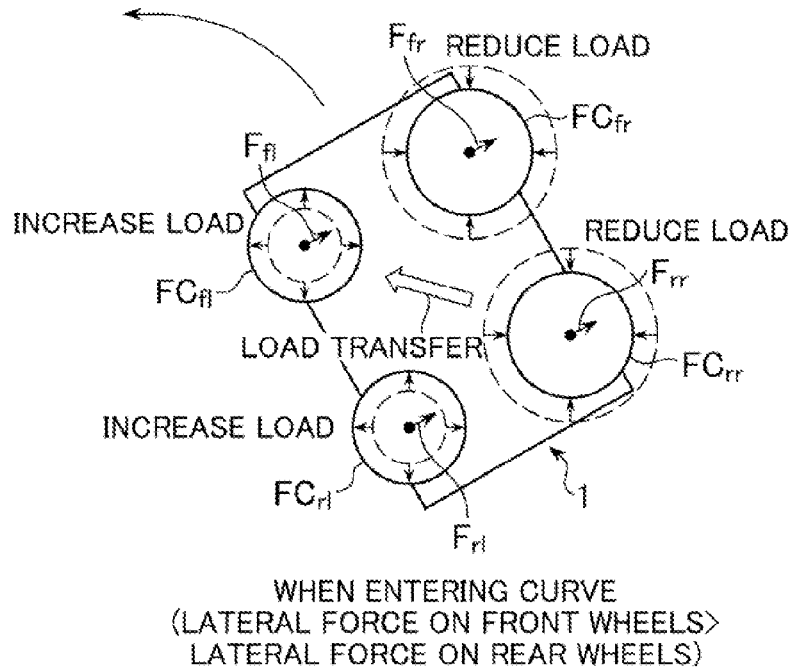
FIGS. 5A and 5B are explanatory views illustrating the relationship between the tire forces and the friction circles according to the first embodiment, where
Figure 5B:
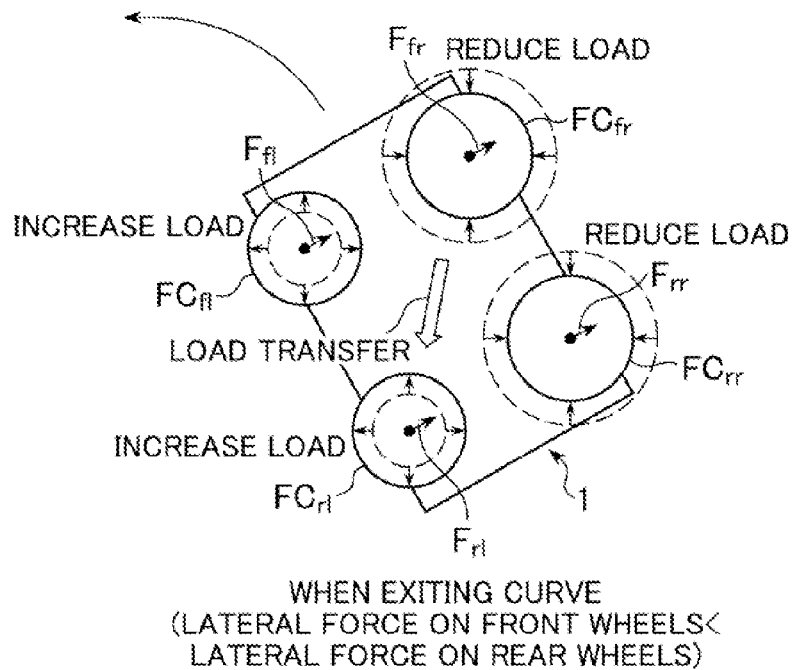

FIG. 5A illustrates a state in which the vehicle 1 according to the first embodiment enters the curve (at the time of entering the turn), whereas FIG. 5B illustrates a state in which the vehicle 1 according to the first embodiment exits the curve (at the time of exiting the turn).

In the controller 21, when the vehicle behavior estimation section 22 estimates that the vehicle 1 is in a turning state, the tire load calculation section 25 calculates the tire load factors $\eta_i$ of the respective wheels. Then, the target tire vertical-load calculation section 27 and the vertical-load control section 28 control the thrusts of the electromagnetic dampers $7_i$ so that the tire load factors $\eta_i$ of the respective wheels become equal to each other (tire load factor average value $\eta_{ave}$). As a result, as illustrated in FIG. 5A, when the vehicle 1 enters the turn, the controller 21 decreases the vertical load $Fz_{rr}$ on the rear right wheel $3_{rr}$ having the smaller tire load factor $\eta_{rr}$ while increasing the vertical load $Fz_{fl}$ on the front left wheel $3_{fl}$ having the larger tire load factor $\eta_{fl}$. Moreover, as illustrated in FIG. 5B, when the vehicle 1 exits the turn, the controller 21 decreases the vertical load $Fz_{fr}$ on the front right wheel $3_{fr}$ having the smaller tire load factor $\eta_{fr}$ while increasing the vertical load $Fz_{rl}$ on the rear left wheel $3_{rl}$ having the larger tire load factor $\eta_{rl}$.

In this manner, the tire forces $F_i$ of all the four tires can be maximally used. Therefore, drive performance and steering stability of the vehicle 1 can be improved. Moreover, the controller 21 can control the electromagnetic dampers $7_i$ only by controlling the tire load factors $\eta_i$ without directly handling, for example, understeer or oversteer. Therefore, the control is not required to be performed separately for conditions under which the understeer occurs and for conditions under which the oversteer occurs. Therefore, the electromagnetic dampers $7_i$ can be controlled by a simple logic.

Moreover, the controller 21 performs the control so as to change the wheel $3_i$ from which the load is transferred between at time of entering the turn and at time of exiting the turn. As a result, for example, even if the wheel $3_i$ having the larger tire load factor $\eta_i$ at the time of entering the turn when the driver starts turning the steering wheel is different from that at the time of exiting the turn when the driver starts returning the steering wheel, the load applied to the wheel $3_i$ having the larger tire load factor $\eta_i$ can be increased to decrease the tire load factor $\eta_i$. Therefore, at any of the time of entering the turn and the time of exiting the turn, the tire forces $F_i$ of the all the wheels $3_i$ can be effectively used to improve the drive performance and steering stability of the vehicle 1.

Next, FIGS. 6 and 7 illustrate a second embodiment of the present invention. The second embodiment has a feature in that the vertical loads are controlled by roll stiffness distribution control. In the second embodiment, the same components as those of the first embodiment described above are denoted by the same reference symbols, and the description thereof is herein omitted.

A vehicle 31 according to the second embodiment includes the vehicle body 2, the wheels $3_i$, the suspension devices $5_i$, the sensors 8 to 12, and a controller 32.

An input side of the controller 32 according to the second embodiment is connected to the yaw-rate sensor 8, the longitudinal acceleration sensor 9, the lateral acceleration sensor 10, the steering-angle sensor 11, and the vehicle-velocity sensor 12, whereas an output side thereof is connected to the actuators (not shown) for the electromagnetic dampers $7_i$.

As in the case of the controller 21 according to the first embodiment, the controller 32 includes the vehicle behavior estimation section 22, the vertical-load calculation section 23, the online tire model 24, the tire load calculation section 25, the target tire load-factor calculation section 26, the target tire vertical-load calculation section 27, and a suspension control section 34. The controller 32 according to the second embodiment differs from the controller 21 according to the first embodiment in that a roll stiffness distribution control section 33 (roll stiffness distribution control means) for controlling roll stiffness distribution based on the vertical loads $Fz_i$ and the target tire vertical loads $Fzref_i$ on the respective wheels is provided and the suspension control section 29 is replaced by the suspension control section 34. In this case, the roll stiffness distribution control section 33 constitutes vertical-load control means together with the target tire load-factor calculation section 26, the target tire vertical-load calculation section 27, and the suspension control section 34. The roll stiffness distribution control section 33 controls the roll stiffness to be distributed to the front wheels $3_{fr}$ and $3_{fl}$ and that to the rear wheels $3_{rr}$ and $3_{rl}$ to adjust a load transfer amount between the front wheels $3_{fr}$ and $3_{fl}$ and the rear wheels $3_{rr}$ and $3_{rl}$ so that the tire load factor $\eta_i$ is decreased for the tire 4 having the larger tire load factor $\eta_i$.

As specific operation contents of the roll stiffness distribution control section 33, the roll stiffness distribution control in consideration of the target tire vertical loads $Fzref_i$ is described in detail. First, as in the case of the first embodiment, the target tire vertical-load calculation section 27 calculates the target tire vertical load $Fzref_i$ for each of the wheels. Next, as expressed by Expression 4, the vertical load $Fz_i$ is subtracted from the calculated target tire vertical load $Fzref_i$ to calculate a tire vertical-load deviation $\Delta Fz_i$.

$$\Delta Fz_i = Fzref_i - Fz_i \tag{4}$$

In this case, when the tire vertical-load deviation $\Delta Fz_i$ is positive ($\Delta Fz_i > 0$), the vertical load $Fz_i$ is in an insufficient state, specifically, the vertical load $Fz_i$ is requested to be increased. On the other hand, when the tire vertical-load deviation $\Delta Fz_i$ is negative ($\Delta Fz_i < 0$), the vertical load $Fz_i$ is in an excessively large state, specifically, the vertical load $Fz_i$ is requested to be decreased.

Next, as expressed by Expression 5, a minimum value of the tire vertical-load deviations $\Delta Fz_i$ of the front wheels and a minimum value of the tire vertical-load deviations $\Delta Fz_i$ of the rear wheels are selected. Then, a difference $\Delta Fz_{minFr-Rr}$ therebetween is calculated. When the vehicle 31 is in a turning state, any one (for the wheel on the outside of the turn) of the tire vertical-load deviation $\Delta Fz_{fr}$ of the front right wheel $3_{fr}$ and the tire vertical-load deviation $\Delta Fz_{fl}$ of the front left wheel $3_{fl}$ tends to have a positive value, whereas another (for the wheel on the inside of the turn) thereof tends to have a negative value. Similarly, when the vehicle 31 is in a turning state, any one (for the wheel on the outside of the turn) of the tire vertical-load deviation $\Delta Fz_{rr}$ of the rear right wheel $3_{rr}$ and the tire vertical-load deviation $\Delta Fz_{rl}$ of the rear left wheel $3_{rl}$ tends to have a positive value, whereas another (for the wheel on the inside of the turn) thereof tends to have a negative value. Therefore, when the vehicle 31 is in a turning state, for the first term and second term of the right side of Expression 5, the tire vertical-load deviations $\Delta Fz_i$ of the turn outside wheels, which have the negative values, are selected.

$$\Delta Fz_{minFr-Rr} = \min(\Delta Fz_{fr}, \Delta Fz_{fl}) - \min(\Delta Fz_{rr}, \Delta Fz_{rl}) \tag{5}$$

When the difference $\Delta Fz_{minFr-Rr}$ is positive ($\Delta Fz_{minFr-Rr} > 0$), a requested degree of decreasing the vertical loads $Fz_i$ is higher for the rear wheels $3_{rr}$ and $3_{rl}$ than for the front wheels $3_{fr}$ and $3_{fl}$. On the other hand, when the difference $\Delta Fz_{minFr-Rr}$ is negative ($Fz_{minFr-Rr} < 0$), a requested degree of decreasing the vertical loads $Fz_i$ is higher for the front wheels $3_{fr}$ and $3_{fl}$ than for the rear wheels $3_{rr}$ and $3_{rl}$.

Figure 9A:
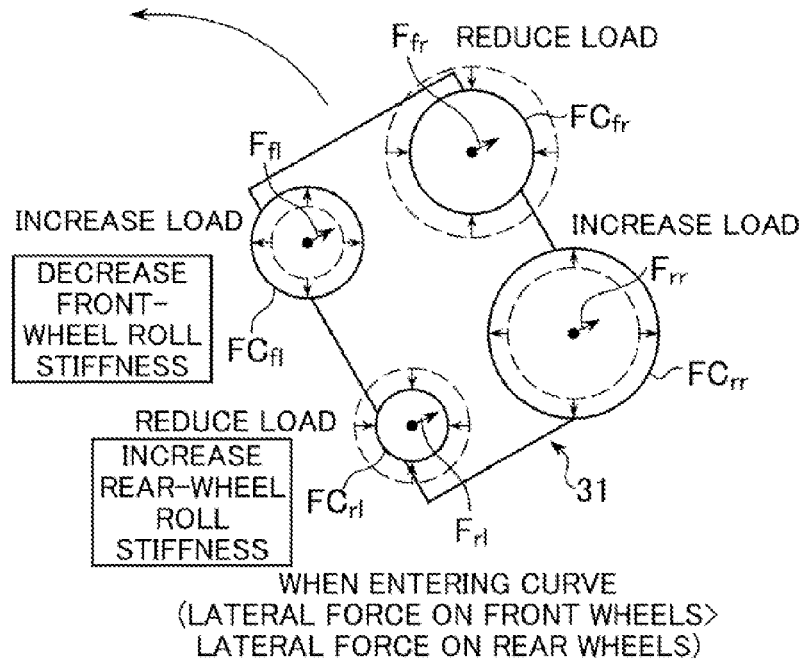
FIGS. 9A and 9B are explanatory views illustrating the relationship between the tire forces and the friction circles according to the second embodiment, where
Figure 9B:
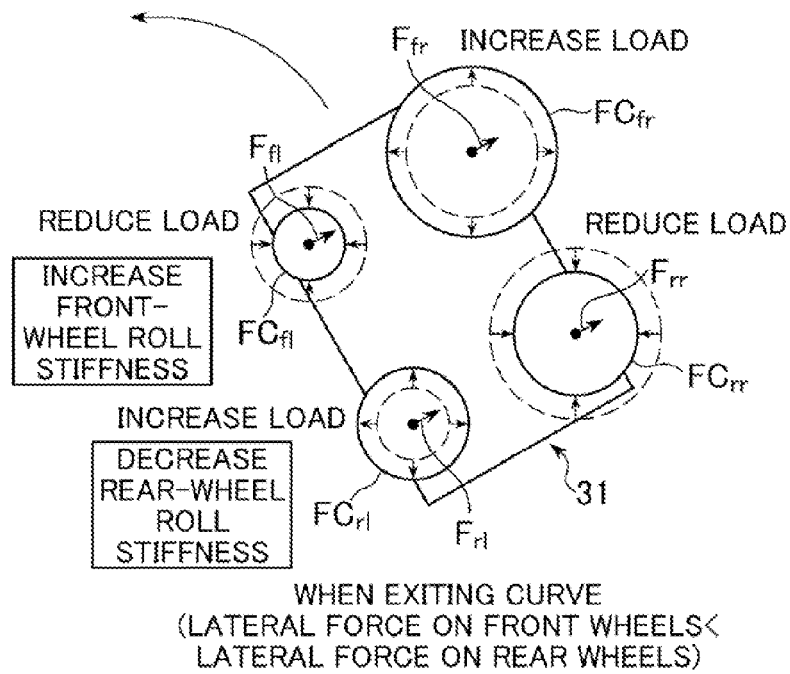

Therefore, for example, when a requested degree of decreasing the vertical loads is higher for the front wheels $3_{fr}$ and $3_{fl}$ as illustrated in FIG. 9B, the roll stiffness to be distributed to the rear wheels $3_{rr}$ and $3_{rl}$ is reduced. In this manner, the load (vertical load $Fz_i$) on one of the rear wheels $3_{rr}$ and $3_{rl}$, which has the smaller tire load factor $\eta_i$, is reduced, while the load (vertical load $Fz_i$) on another thereof, which has the larger tire load factor $\eta_i$, is increased, thereby improving the tire load factors $\eta_{rr}$ and $\eta_{rl}$. On the contrary, when a requested degree of decreasing the vertical loads is higher for the rear wheels $3_{rr}$ and $3_{rl}$ as illustrated in FIG. 9A, the roll stiffness to be distributed to the front wheels $3_{fr}$ and $3_{fl}$ is reduced. In this manner, the load (vertical load $Fz_i$) on one of the front wheels $3_{fr}$ and $3_{fl}$, which has the smaller tire load factor $\eta_i$, is reduced, while the load (vertical load $Fz_i$) on another thereof, which has the larger tire load factor $\eta_i$, is increased, thereby improving the tire load factors $\eta_{fr}$ and $\eta_{fl}$. Specifically, a front-wheel roll stiffness distribution command $R_{RllStfFr}$ is expressed as Expression 6.

$$R_{RllStfFr} = -k_{RllStfFr} \cdot \Delta Fz_{minFr-Rr} + R_{RllStfFrIni} \tag{6}$$

In Expression 6, $k_{RllStfFr}$ is a front-wheel roll stiffness distribution gain [1/N] (positive value), and $R_{RllStfFrIni}$ is a front-wheel roll stiffness distribution initial value.

The suspension control section 34 uses the calculated front-wheel roll stiffness distribution command $R_{RllStfFr}$ for an anti-roll control section for suppressing roll occurring due to the lateral acceleration Ay to adjust a control amount for each of the wheels based on Expression 7.

$$M_{antRll} = k_{antRll} \cdot Ay$$

$$M_{antRllFr} = R_{RllStfFr} \cdot M_{antRll}$$

$$M_{antRllRr} = (1 - R_{RllStfFr}) \cdot M_{antRll} \tag{7}$$

In Expression 7, $M_{antRll}$ is a target roll moment, $k_{antRll}$ is a target roll moment gain, $M_{antRllFr}$ is a front-wheel target roll moment, and $M_{antRllRr}$ is a rear-wheel target roll moment.

Next, based on the calculated front-wheel target roll moment $M_{antRllFr}$ for the front wheels $3_{fr}$ and $3_{fl}$ and the calculated rear-wheel target roll moment $M_{antRllRr}$ for the rear wheels $3_{rr}$ and $3_{rl}$, target thrusts FR, FL, RR, and RL for the respective wheels are determined so that the electromagnetic dampers $7_i$ for the respective wheels are controlled.

Specifically, the suspension control section 34 includes blocks 34A, 34B, 34C, 34D, 34E, and 34F. As illustrated in FIG. 7, in the block 34A, the front-wheel target roll moment $M_{antRllFr}$ is divided into two so as to be equally distributed to the front left wheel $3_{fl}$ and the front right wheel $3_{fr}$. In the subsequent block 34B, the roll moment ($M_{antRllFr}/2$) obtained by equal distribution is divided by a half of a tread (1wf/2) to obtain the target thrust FR for the front right wheel $3_{fr}$. Similarly, in the block 34C, the roll moment ($M_{antRllFr}/2$) obtained by equal distribution is divided by the half of the tread (1wf/2) to obtain the target thrust FL for the front left wheel $3_{fl}$.

On the other hand, in the block 34D, the rear-wheel target roll moment $M_{antRllRr}$ is divided into two so as to be equally distributed to the rear left wheel $3_{rl}$ and the rear right wheel $3_{rr}$. In the subsequent block 34E, the roll moment ($M_{antRllRr}/2$) obtained by equal distribution is divided by the half of the tread (1wf/2) to obtain the target thrust RR for the rear right wheel $3_{rr}$. Similarly, in the block 34F, the roll moment ($M_{antRllRr}/2$) obtained by equal distribution is divided by the half of the tread (1wf/2) to obtain the target thrust RL for the rear left wheel $3_{rl}$.

Finally, the suspension control section 34 calculates command values in accordance with the target thrusts FR, FL, RR, and RL for the respective wheels and outputs the command signals $So_i$ such as the currents in accordance with the command values to the actuators for the electromagnetic dampers $7_i$.

The vehicle behavior control apparatus according to the second embodiment has the configuration described above. Next, an operation of the vehicle behavior control by the controller 32 is described in comparison with a second comparison example where, for example, roll stiffness distribution control disclosed in Japanese Patent No. 4285343 is performed.

In the configuration of the second comparative example, the roll stiffness is distributed so that a difference between a degree of allowance for the generation of the lateral force on the front wheels and that on the rear wheels is reduced so that the degrees of allowance become the same. Therefore, in the second comparative example, when the loads on the front wheels are larger than those on the rear wheels and there is an allowance for the generation of the lateral force on the rear wheels, the roll stiffness to be distributed to the front wheels is increased, whereas the roll stiffness to be distributed to the rear wheels is reduced. On the contrary, when the loads on the rear wheels are larger than those on the front wheels and there is an allowance for the generation of the lateral force on the front wheels, the roll stiffness to be distributed to the rear wheels is increased, whereas the roll stiffness to be distributed to the front wheels is reduced. In this manner, the roll stiffness distribution is controlled so that the loads on the wheels on which the lateral force is generated are increased to increase the friction circle in size.

Figure 8A:
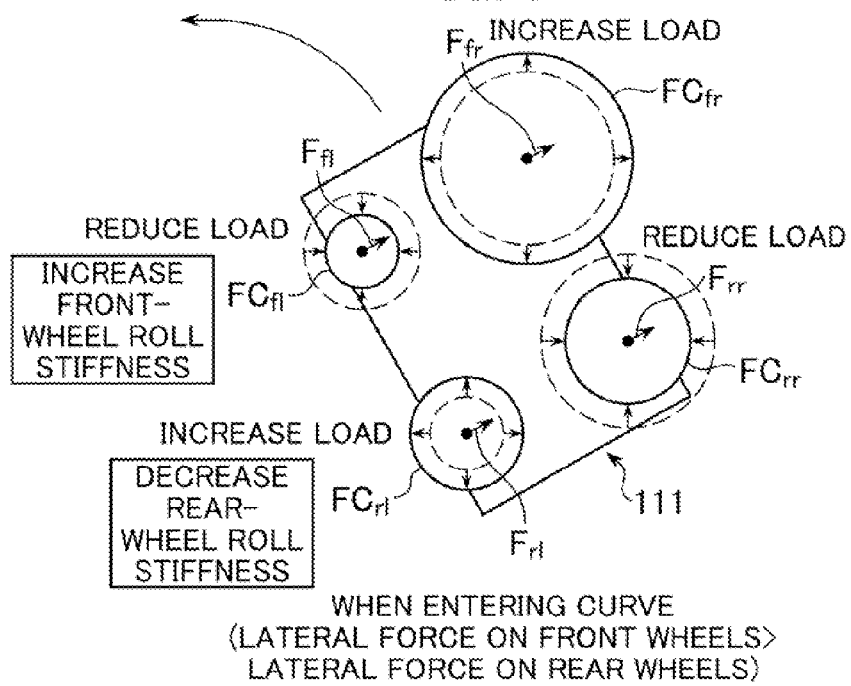
FIGS. 8A and 8B are explanatory views illustrating the relationship between the tire forces and the friction circles according to a second comparative example, where
Figure 8B:
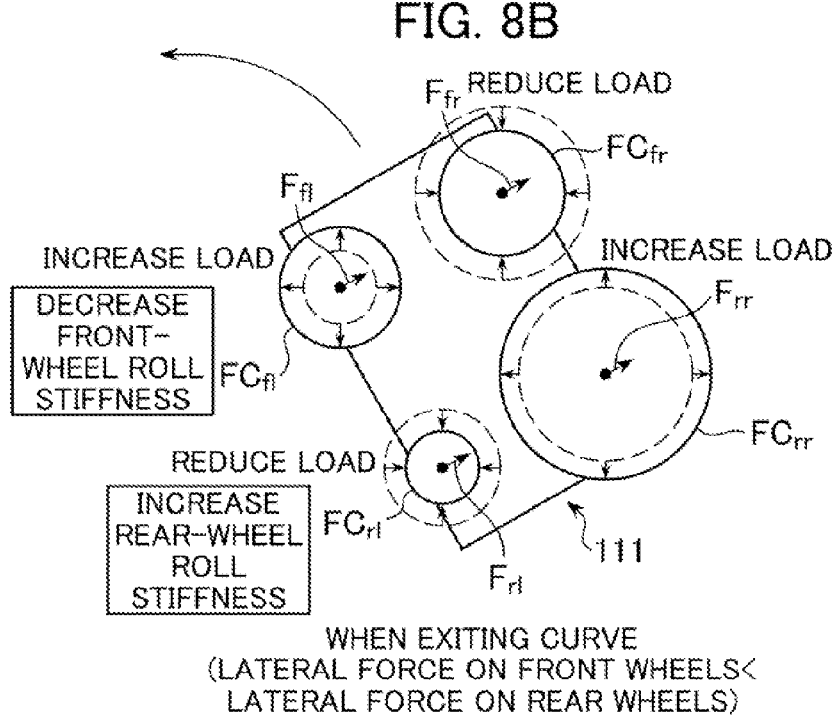

FIG. 8A illustrates a state in which a vehicle 111 according to the second comparative example enters the curve (at the time of entering the turn), whereas FIG. 8B illustrates a state in which the vehicle 111 according to the second comparative example exits the curve (at the time of exiting the turn). As illustrated in FIGS. 8A and 8B, when the vehicle 111 is turning, the load transfers from the inside of the turn to the outside of the turn under the effects of the inertia force. As a result, the loads on the wheels on the outside of the turn increase, whereas the loads on the wheels on the inside of the turn decrease.

As illustrated in FIG. 8A, in the second comparative example, the load on the front right wheel on which the largest lateral force is generated at the time of entering the turn is increased. At this time, the load on the front left wheel having the larger tire load factor is reduced. Therefore, the tire force $F_{fl}$ of the front left wheel is sometimes saturated by the friction circle $FC_{fl}$.

As illustrated in FIG. 8B, in the second comparative example, the load on the rear right wheel on which the largest lateral force is generated at the time of exiting the turn is increased. At this time, the load on the rear left wheel having the larger tire load factor is reduced. Therefore, the tire force $F_{rl}$ of the rear left wheel is sometimes saturated by the friction circle $FC_{rl}$. In the second comparative example, the load is transferred from the tire having the larger tire load factor. Therefore, the tire force $F_i$ is saturated by the friction circle $FC_i$. As a result, the tire force $F_i$ cannot be effectively used in some cases.

FIG. 9A illustrates a state in which the vehicle 31 according to the second embodiment enters the curve (at the time of entering the turn), whereas FIG. 9B illustrates a state in which the vehicle 31 according to the second embodiment exits the curve (at the time of exiting the turn).

At this time, in the controller 32, when the vehicle behavior estimation section 22 estimates that the vehicle 31 is in a turning state, the tire load factors $\eta_i$ of the respective wheels are calculated by the tire load calculation section 25. Then, the controller 32 controls the thrusts of the electromagnetic dampers $7_i$ so that the load (vertical load $Fz_i$) on the tire 4 having the larger tire load factor $\eta_i$ is increased by the roll stiffness distribution control section 33. Specifically, as illustrated in FIG. 9A, at the time of entering the turn at which the loads on the front wheels $3_{fr}$ and $3_{fl}$ are larger than those on the rear wheels $3_{rr}$ and $3_{rl}$, the roll stiffness of the rear wheels $3_{rr}$ and $3_{rl}$, each having the smaller tire load factor $\eta_i$, is increased, whereas the roll stiffness of the front wheels $3_{fr}$ and $3_{fl}$, each having the larger tire load factor $\eta_i$, is reduced. At this time, the vertical load $Fz_{fl}$ on the front left wheel $3_{fl}$ having the largest tire load factor $\eta_{fl}$ increases. Similarly, as illustrated in FIG. 9B, at the time of exiting the turn at which the loads on the rear wheels $3_{rr}$ and $3_{rl}$ are larger than those on the front wheels $3_{fr}$ and $3_{fl}$, the roll stiffness of the front wheels $3_{fr}$ and $3_{fl}$, each having the smaller tire load factor $\eta_i$, is increased, whereas the roll stiffness of the rear wheels $3_{rr}$ and $3_{rl}$, each having the larger tire load factor $\eta_i$, is reduced. At this time, the vertical load $Fz_{rl}$ on the rear left wheel $3_{rl}$ having the largest tire load factor $\eta_{rl}$ increases.

In this manner, the saturation of the tire force $F_i$ can be suppressed by increasing the load on the wheel $3_i$ having the largest tire load factor $\eta_i$. As a result, the tire forces $F_i$ of all the four wheels can be maximally used. Therefore, the drive performance and steering stability of the vehicle 31 can be improved.

As described above, even in the second embodiment having the configuration described above, by performing the vertical load control through the roll stiffness distribution control, substantially the same functions and effects as those of the first embodiment can be obtained. Moreover, in the second embodiment, the controller 32 includes the roll stiffness distribution control section 33 for controlling the roll stiffness to be distributed to the front wheels $3_{fr}$ and $3_{fl}$ and that to be distributed to the rear wheels $3_{rr}$ and $3_{rl}$ so as to increase the vertical load $Fz_i$ to be applied to the wheel $3_i$ having the largest tire load factor $\eta_i$.

Specifically, when the requested degree of decreasing the loads is higher for the rear wheels $3_{rr}$ and $3_{rl}$ than for the front wheels $3_{fr}$ and $3_{fl}$, the roll stiffness distribution control section 33 reduces the roll stiffness to be distributed to the front wheels $3_{fr}$ and $3_{fl}$. As a result, the load can be reduced for one of the front wheels $3_{fr}$ and $3_{fl}$, to which the larger load is applied, whereas the load can be increased for another thereof, to which the smaller load is applied.

Moreover, when the requested degree of decreasing the loads is higher for the front wheels $3_{fr}$ and $3_{fl}$ than for the rear wheels $3_{rr}$ and $3_{rl}$, the roll stiffness distribution control section 33 reduces the roll stiffness to be distributed to the rear wheels $3_{rr}$ and $3_{rl}$. As a result, the load can be reduced for one of the rear wheels $3_{rr}$ and $3_{rl}$, to which the larger load is applied, whereas the load can be increased for another thereof, to which the smaller load is applied.

As a result, by controlling the roll stiffness to be distributed to the front wheels $3_{fr}$ and $3_{fl}$ and that to be distributed to the rear wheels $3_{rr}$ and $3_{rl}$, the vertical load $Fz_i$ to be applied to the wheel $3_i$ having the largest tire load factor $\eta_i$ can be increased. Thus, the drive performance and steering stability of the vehicle 31 can be improved.

Figure 10:
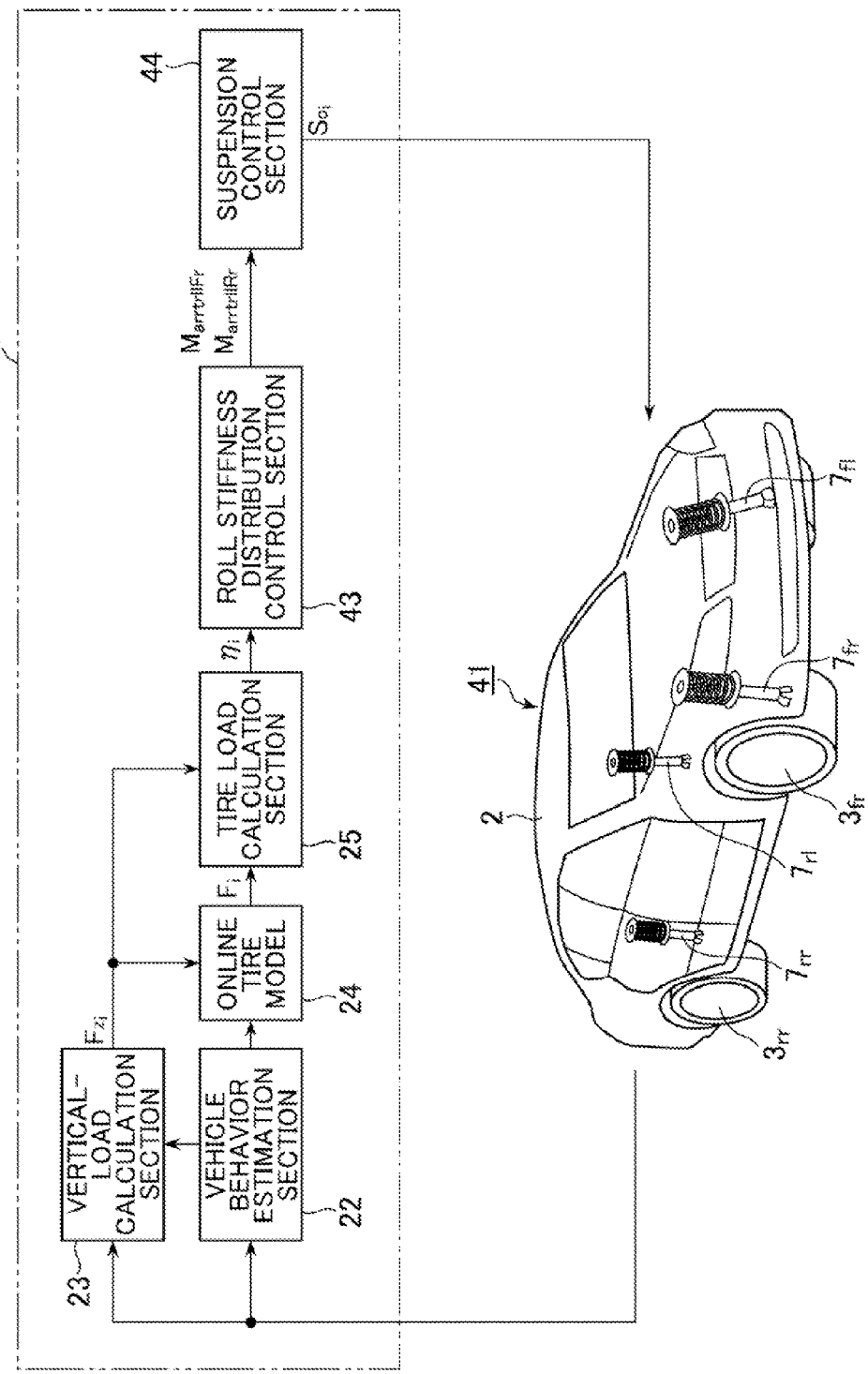
FIG. 10 is a control block diagram illustrating a vehicle behavior control apparatus according to a third embodiment of the present invention.

Next, FIG. 10 illustrates a third embodiment of the present invention. The third embodiment has a feature in that the roll stiffness distribution control is performed based on the tire load factors of the respective wheels. In the third embodiment, the same components as those of the first embodiment described above are denoted by the same reference symbols, and the description thereof is herein omitted.

A vehicle 41 according to the third embodiment includes the vehicle body 2, the wheels $3_i$, the suspension devices $5_i$, the sensors 8 to 12, and a controller 42.

An input side of the controller 42 according to the third embodiment is connected to the yaw-rate sensor 8, the longitudinal acceleration sensor 9, the lateral acceleration sensor 10, the steering-angle sensor 11, and the vehicle-velocity sensor 12, whereas an output side thereof is connected to the actuators (not shown) for the electromagnetic dampers $7_i$.

As in the case of the controller 21 according to the first embodiment, the controller 42 includes the vehicle behavior estimation section 22, the vertical-load calculation section 23, the online tire model 24, the tire load calculation section 25, and a suspension control section 44. The controller 42 according to the third embodiment differs from the controller 21 according to the first embodiment in that a roll stiffness distribution control section 43 (roll stiffness distribution control means) for controlling the roll stiffness distribution based on the tire load factors $\eta_i$ of the respective wheels is provided and the suspension control section 29 is replaced by the suspension control section 44. In this case, the roll stiffness distribution control section 43 constitutes vertical-load control means together with the suspension control section 44.

In the controller 42, when the vehicle behavior estimation section 22 estimates that the vehicle 41 is in a turning state, the tire load factors $\eta_i$ of the respective wheels are calculated by the tire load calculation section 25. Then, the controller 42 controls the thrusts of the electromagnetic dampers $7_i$ so that the load (vertical load $Fz_i$) on the tire 4 having the larger tire load factor $\eta_i$ is increased by the roll stiffness distribution control section 43. The roll stiffness distribution control section 43 controls the roll stiffness to be distributed to the front wheels $3_{fr}$ and $3_{fl}$ and that to be distributed to the rear wheels $3_{rr}$ and $3_{rl}$ to adjust the load transfer amount between the front wheels $3_{fr}$ and $3_{fl}$ and the rear wheels $3_{rr}$ and $3_{rl}$. For the tire 4 having the larger tire load factor $\eta_i$, the tire load factor $\eta_i$ is reduced.

As specific operation contents of the roll stiffness distribution control section 43, the roll stiffness distribution control in consideration of the tire load factors $\eta_i$ is described in detail. First, as in the case of the first embodiment, the tire load factors $\eta_i$ of the respective wheels are calculated by the tire load calculation section 25.

Next, as expressed by Expression 8, the minimum value of the tire load factors $\eta_i$ of the front wheels $3_{fr}$ and $3_{fl}$ and the minimum value of the tire load factors $\eta_i$ of the rear wheels $3_{rr}$ and $3_{rl}$ are selected. Then, a difference $\eta_{minFr-Rr}$ between the minimum values is calculated.

$$\eta_{minFr-Rr} = \min(\eta_{fr}, \eta_{fl}) - \min(\eta_{rr}, \eta_{rl}) \tag{8}$$

Here, when the difference $\eta_{minFr-Rr}$ is positive ($\eta_{minFr-Rr} > 0$), the tire load factors $\eta_i$ of the rear wheels $3_{rr}$ and $3_{rl}$ are smaller than those of the front wheels $3_{fr}$ and $3_{fl}$. On the other hand, when the difference $\eta_{minFr-Rr}$ is negative ($\eta_{minFr-Rr} < 0$), the tire load factors $\eta_i$ of the front wheels $3_{fr}$ and $3_{fl}$ are larger than those of the rear wheels $3_{rr}$ and $3_{rl}$.

Therefore, for example, as illustrated in FIG. 9B, when the tire load factors $\eta_i$ of the front wheels $3_{fr}$ and $3_{fl}$ are smaller, the roll stiffness to be distributed to the rear wheels $3_{rr}$ and $3_{rl}$ is reduced. As a result, the load (vertical load $Fz_i$) on one of the rear wheels $3_{rr}$ and $3_{rl}$, which has the smaller tire load factor $\eta_i$, is reduced, whereas the load (vertical load $Fz_i$) on another thereof, which has the larger tire load factor $\eta_i$, is increased, thereby improving the tire load factors $\eta_{rr}$, and $\eta_{rl}$. On the other hand, for example, as illustrated in FIG. 9A, when the tire load factors $\eta_i$ of the rear wheels $3_{rr}$ and $3_{rl}$ are smaller, the roll stiffness to be distributed to the front wheels $3_{fr}$ and $3_{fl}$ is reduced. As a result, the load (vertical load $Fz_i$) on one of the front wheels $3_{fr}$ and $3_{fl}$, which has the smaller tire load factor $\eta_i$, is reduced, whereas the load (vertical load $Fz_i$) on another thereof, which has the larger tire load factor $\eta_i$, is increased, thereby improving the tire load factors $\eta_{fr}$ and $\eta_{fl}$. Specifically, the front-wheel roll stiffness distribution command $R_{RllStfFr}$ is expressed as Expression 9.

$$R_{RllStfFr} = -k_{RllStfFr} \cdot \eta_{minFr-Rr} + R_{RllStfFrIni} \tag{9}$$

In Expression 9, $k_{RllStfFr}$ is the front-wheel roll stiffness distribution gain [1/N] (positive value), and $R_{RllStfFrIni}$ is the front-wheel roll stiffness distribution initial value.

The suspension control section 44 is configured substantially the same as the suspension control section 34 according to the second embodiment. Therefore, the suspension control section 44 uses the calculated front-wheel roll stiffness distribution command $R_{RllStfFr}$ for the anti-roll control section for suppressing roll occurring due to the lateral acceleration Ay to adjust a control amount for each of the wheels based on Expression 7.

Figure 11:
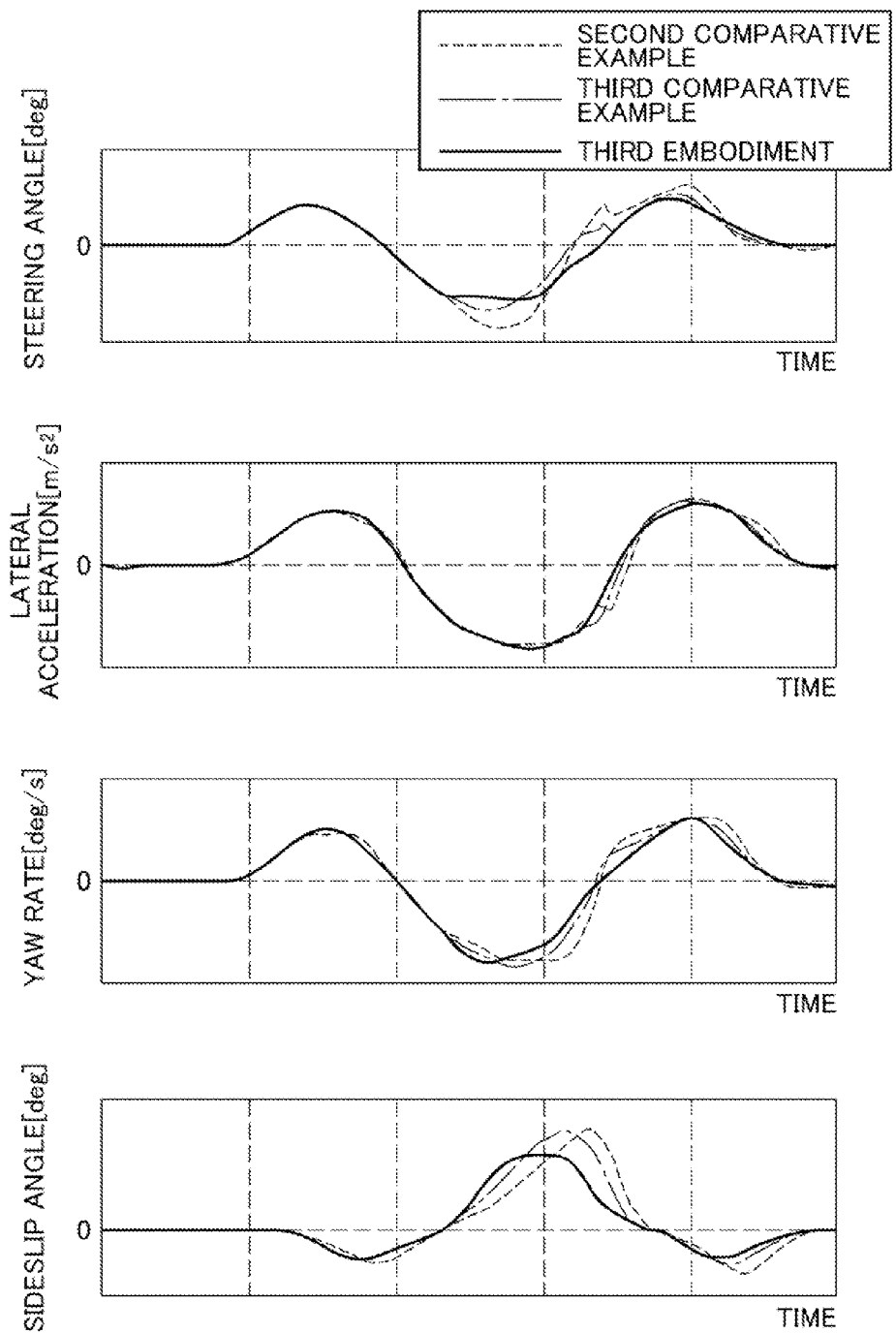
FIG. 11 is a characteristic diagram illustrating temporal changes in steering angle, lateral acceleration, yaw rate, and sideslip angle.
Figure 12:
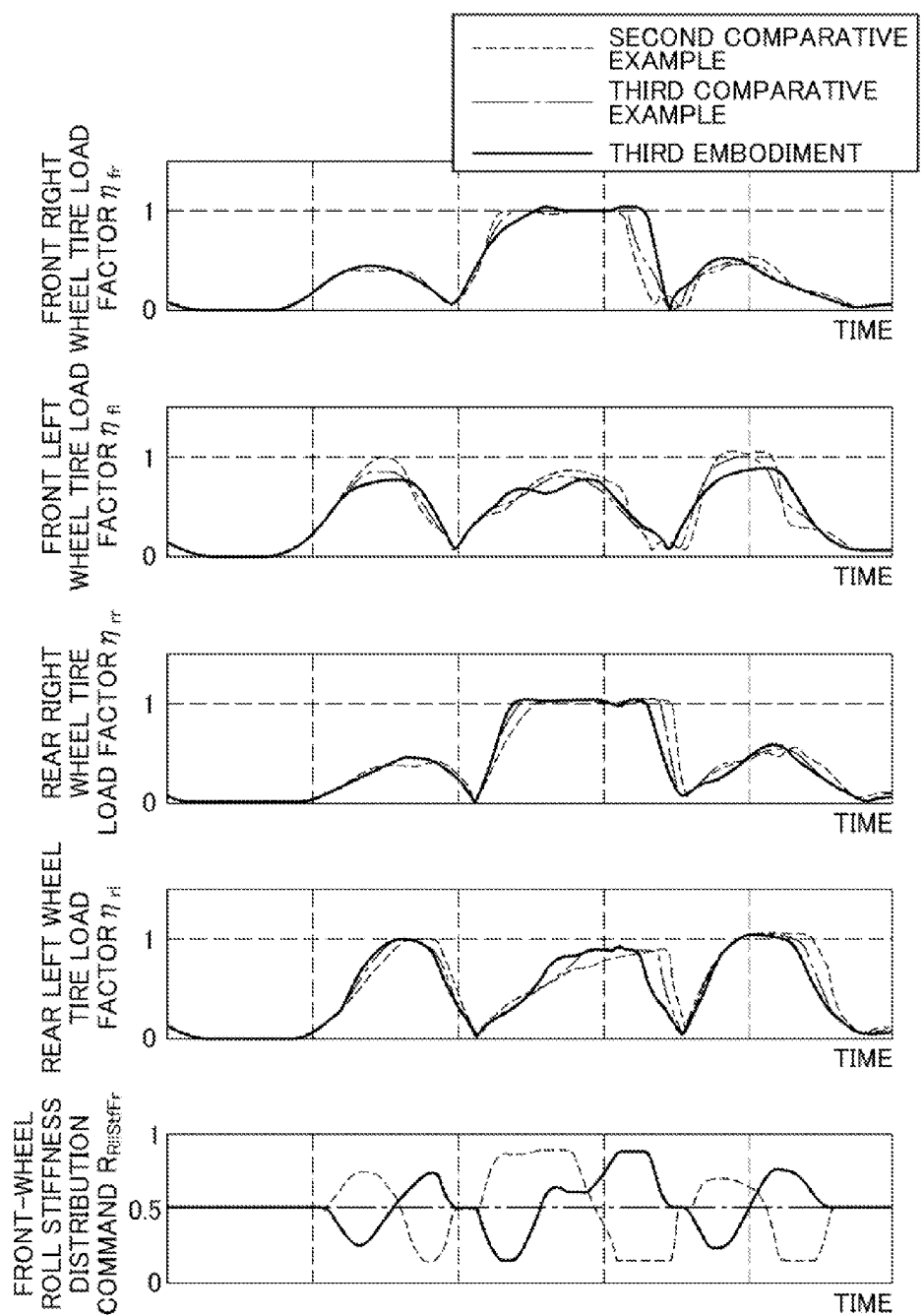
FIG. 12 is a characteristic diagram illustrating temporal changes in tire load factors of the respective wheels and front-wheel roll stiffness distribution command.

In order to examine the effects provided by the third embodiment, a simulation using a full vehicle model which enabled the analysis of a vertical motion, a translational motion, a yaw motion, a roll motion, and a pitch motion was carried out. For a vehicle motion calculation, CarSim (registered trademark) was used. The electromagnetic dampers $7_i$ and the controller 32 were modeled by using Matlab or Simulink (registered trademark). As parameters of the vehicle model, values assuming a large-size rear-wheel drive sedan were set. As simulation conditions, the simulation was carried out in a course defined in ISO3888 Part 2, and an approaching vehicle velocity was 60 km/h. FIGS. 11, 12, and 13 show the results.

In FIGS. 11 to 13, the solid line corresponds to the third embodiment, the broken line corresponds to the second comparative example (Japanese Patent No. 4285343) described above, and the alternate long and short dash line corresponds to a third comparative example where a rate of the roll stiffness to be distributed to the front wheels and that to be distributed to the rear wheels are fixed to be equal to each other (0.5).

FIG. 11 shows time-series data of the steering angle, the lateral acceleration, the yaw rate, and a sideslip angle. As the results of FIG. 11 show, the steering angle and the sideslip angle of the third embodiment are smaller than those of the second comparative example and the third comparative example. Therefore, it is understood that the understeer and the oversteer are improved by taking only the tire load factors $\eta_i$ into consideration.

FIG. 12 shows time-series data of the tire load factors $\eta_i$ of the respective wheels. As the results of FIG. 12 show, the front-wheel roll stiffness distribution ratio (front-wheel roll stiffness distribution command $R_{RllStfFr}$), which is the command value, exhibits an opposite tendency as compared with the second comparative example. In addition, it is understood that the front-wheel roll stiffness distribution ratio changes continuously in accordance with the tire load factors $\eta_i$.

FIG. 13 shows time-series data of the vertical loads $Fz_i$ on the respective wheels. As the results of FIG. 13 show, the vertical loads $Fz_i$ on the respective wheels change in accordance with the front-wheel roll stiffness distribution command $R_{RllStfFr}$. Therefore, it is understood that the vertical loads $Fz_i$ can be controlled by changing the roll stiffness distribution.

As described above, even in the third embodiment having the configuration described above, substantially the same functions and effects as those of the first embodiment and the second embodiment can be obtained.

The detection of the yaw rate by using the yaw-rate sensor 8 has been described as an example in the first to third embodiments. However, the present invention is not limited thereto. For example, the yaw rate may alternatively be calculated by using a plurality of forward and backward acceleration sensors mounted onto the vehicle body.

In the first to third embodiments, the vehicle behavior estimation section 22, the vertical-load calculation section 23, the online tire model 24, and the tire load calculation section 25 constitute means for estimating the degree of allowance for the generation of the lateral force on each of the wheels.

Moreover, in the first to third embodiments, the load applied to each of the wheels is controlled by the active suspension device corresponding to the electromagnetic damper $7_i$. However, the present invention is not limited thereto. For example, an active stabilizer device or a semi-active suspension device capable of controlling the damping force may be used. Specifically, any known means in the field of the art is applicable as long as the means can increase and decrease the vertical load on the wheel. Moreover, the present invention is applicable not only to four-wheel automobiles but also to various types of vehicles including a plurality of wheels.

Next, the relationship between the present invention and other control is described. Although the control on the vertical loads based on the tire load factors according to the present invention may be constantly performed, the vertical-load control of the present invention may be combined with other control. As the other control, there is ride comfort control such as well-known skyhook control or control for improving roll feeling at the time of steering, as described in the related art literatures. In combination of each control described above, switching control may be performed so that, for example, a vehicle running state at the limit in which the tire starts slipping is determined based on the lateral acceleration and the control of the present invention is performed when the vehicle is placed in the running state at the limit. Alternatively, a computation may be carried out simultaneously with another control so that the suspensions are controlled with the largest values. Further alternatively, the suspensions may be controlled by adding the values of the respective types of control at a predetermined rate.

Next, the inventions included in the embodiments described above are described. Specifically, according to one embodiment of the present invention, the vehicle behavior control apparatus includes: means for estimating a degree of allowance for generation of a lateral force on a front wheel and on a rear wheel; vehicle behavior estimation means for estimating the behavior of the vehicle; tire load calculation means for calculating tire load factors of the respective tires; and vertical-load control means for controlling, when the vehicle behavior estimation means estimates that the vehicle is in a turning state, a load applied to a wheel other than a wheel having a larger tire load factor among calculated values of the respective tire load factors calculated by the tire load calculation means, so as to increase a load applied to the wheel having the larger tire load factor.

In this manner, the load applied to the wheel having the larger tire load factor is increased to decrease the tire load factor. Thus, the tire forces of all the wheels can be maximally used. As a result, the drive performance and steering stability of the vehicle can be improved.

According to one embodiment of the present invention, the vertical-load control means performs control so as to change the wheel from which the load is transferred between at time of entering a turn and at time of exiting the turn. As a result, for example, even when the wheel having the larger tire load factor at the time of entering the turn at which the driver starts turning the steering wheel is different from that at the time of exiting the turn at which the driver starts returning the steering wheel, the load applied to the wheel having the larger tire load factor is increased to decrease the tire load factor. Therefore, at any of the time of entering the turn and the time of exiting the turn, the tire forces of all the wheels can be efficiently used to improve the drive performance and the steering stability of the vehicle.

According to one embodiment of the present invention, the vertical-load control means performs control so as to decrease a load applied to a wheel having a smallest tire load factor and increase a load applied to a wheel having a largest tire load factor. In this manner, the load applied to the wheel having the smallest tire load factor can be reduced to increase the tire load factor, while the load applied to the wheel having the largest tire load factor can be increased to reduce the tire load factor. As a result, the tire forces of all the wheels are prevented from being saturated. As a result, the tire forces can be effectively used.

According to one embodiment of the present invention, the vertical-load control means includes roll stiffness distribution control means for controlling roll stiffness to be distributed to the front wheel and roll stiffness to be distributed to the rear wheel so as to increase a load applied to a wheel having a largest tire load factor. As a result, by controlling the roll stiffness to be distributed to the front wheel and that to be distributed to the rear wheel, the load applied to the wheel having the largest tire load factor can be increased to reduce the tire load factor. As a result, the saturation of the tire force can be suppressed. Thus, the drive performance and steering stability of the vehicle can be improved.

According to one embodiment of the present invention, the roll stiffness distribution control means decreases the roll stiffness to be distributed to the front wheel when a requested degree of decreasing the load is higher for the rear wheel than for the front wheel. As a result, the load applied to one of the front right and left wheels, to which a larger load is applied, can be reduced, whereas the load applied to another thereof, to which a smaller load is applied, can be increased. As a result, the load applied to the wheel having the largest tire load factor can be increased.

According to one embodiment of the present invention, the roll stiffness distribution control means decreases the roll stiffness to be distributed to the rear wheel when a requested degree of decreasing the load is higher for the front wheel than for the rear wheel. As a result, the load applied to one of the rear right and left wheels, to which a larger load is applied, can be reduced, whereas the load applied to another thereof, to which a smaller load is applied, can be increased. As a result, the load applied to the wheel having the largest tire load factor can be increased.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2013-180402 filed on Aug. 30, 2013. The entire disclosures of No. 2013-180402 filed on Aug. 30, 2013 including specification, claims, drawings and summary are incorporated herein by reference in its entirety.

What is claimed is:

1. A vehicle behavior control apparatus for controlling a behavior of a vehicle including a plurality of wheels having respective tires externally mounted thereon, the vehicle behavior control apparatus comprising:
a vehicle behavior estimation controller configured to estimate a turning state of the vehicle;
a tire load calculator configured to calculate tire load factors of each of the wheels; and
a vehicle-load controller configured to control, when the vehicle behavior estimation controller estimates that the vehicle is in the turning state, a load applied to each of the wheels based on calculated values of tire load factors indicating a ratio of tire force to maximum friction force of each of the wheels calculated by the tire load calculator, so as to increase a load applied to one of the wheels having a larger one of the tire load factors and to decrease a load applied to one of the wheels having a smaller one of the tire load factors, so that the tire load factors of the respective wheels are equalized,
wherein a wheel in which the load is increased by the vehicle-load controller at a time of entering a turn is different from a wheel in which the load is increased by the vehicle-load controller at a time of exiting the turn.

2. The vehicle behavior control apparatus according to claim 1, wherein the vehicle-load controller decreases a load applied to one of the wheels having a smallest one of the tire load factors, and increases a load applied to another one of the wheels having a largest one of the tire load factors.

3. The vehicle behavior control apparatus according to claim 1, wherein the vehicle-load controller comprises a control section for controlling one of roll stiffness to be distributed to a front one of the wheels, and roll stiffness to be distributed to a rear one of the wheels so as to increase a load applied to a wheel having a largest one of the tire load factors.

4. The vehicle behavior control apparatus according to claim 3, wherein the control section decreases the roll stiffness to be distributed to the front one of the wheels when a requested degree of decreasing the load is higher for the rear one of the wheels than for the front one of the wheels.

5. The vehicle behavior control apparatus according to claim 3, wherein the control section decreases the roll stiffness to be distributed to the rear one of the wheels when a requested degree of decreasing the load is higher for the front one of the wheels than for the rear one of the wheels.

6. The vehicle behavior control apparatus according to claim 1, wherein the tire load calculator calculates the tire load factor $\eta_i$ of each of the wheels by the following equation $$\eta_i = \sqrt{Fx_i^2 + Fy_i^2}/\mu Fz_i$$

where $Fx_i$ is a tire longitudinal force acting on each of the wheels, $Fy_i$ is a tire lateral force acting on each of the wheels, $Fz_i$ is a vertical load acting on each of the wheels, and $\mu$ is a road-surface friction coefficient between each of the tires and the road surface.

7. The vehicle behavior control apparatus according to claim 1, wherein the vehicle-load controller further comprises a calculation section for calculating a tire load factor average value obtained by averaging the tire load factors of the wheels, and
wherein the vehicle-load controller controls the load so that the load is decreased on a wheel having a smaller tire load factor and a load is increased on a wheel having a larger tire load factor, so that the tire load factors of each of the wheels approaches a tire load factor average value.

8. The vehicle behavior control apparatus according to claim 1, wherein the vehicle-load controller further comprises:
a calculation section for calculating a tire load factor average value obtained by averaging the tire load factors of the wheels; and
a calculation section for calculating a target tire vertical load of each of the wheels from the tire load factor average value,
wherein the vehicle-load controller controls a vertical load acting on each of the wheels so as to achieve the target tire vertical load.

9. A vehicle behavior control apparatus for controlling a behavior of a vehicle including a plurality of wheels having respective tires externally mounted thereon, the vehicle behavior control apparatus comprising:
a device configured to increase and decrease a vertical load acting on each of the wheels;
an estimation controller configured to estimate a turning state of the vehicle;
a calculator configured to calculate tire load factors of each of the wheels; and
a vertical load controller configured to control the device, when the estimation controller estimates that the vehicle is in the turning state, so as to decrease a load applied on one of the wheels having a smaller one of the tire load factors, and to increase a load applied on one of the wheels having a larger one of the tire load factors, based on calculated values of the tire load factors indicating a ratio of tire force to maximum friction force of each of the wheels calculated by the calculation, so that the tire load factors of the respective wheels are equalized, wherein a wheel in which the load is increased by the vertical load controller at a time of entering a turn is different from a wheel in which the load is increased by the vertical load controller at a time of exiting the turn.

10. The vehicle behavior control apparatus according to claim 9, wherein the calculator calculates the tire load factor ηi of each of the wheels by the following equation $$\eta_i = \frac{\sqrt{Fx_i^2 + Fy_i^2}}{\mu Fz_i}$$

where $Fx_i$ is a tire longitudinal force acting on each of the wheels, $Fy_i$ is a tire lateral force acting on each of the wheels, $Fz_i$ is a vertical load acting on each of the wheels, and μ is a road-surface friction coefficient between each of the tires and the road surface.

11. The vehicle behavior control apparatus according to claim 9, wherein the vertical load controller further comprises calculation section calculating a tire load factor average value obtained by averaging the tire load factors of each of the wheels, and wherein the vertical load controller increases and decreases a vertical load acting on each of the wheels so that a load is decreased on a wheel having a smaller tire load factor, and a load is increased on a wheel having a larger tire load factor, so that the tire load factors of each of the wheels approaches the tire load factor average value.

12. The vehicle behavior control apparatus according to claim 9, wherein the vertical load controller further comprises a calculation section for calculating a tire load factor average value obtained by averaging the tire load factors of each of the wheels, and a calculation section for calculating a target tire vertical load of each of the wheels from the tire load factor average value, wherein the vertical load controller increases and decreases the vertical load on each of the wheels so that the vertical load acting on each of the wheels achieves the target tire vertical load.

13. The vehicle behavior control apparatus according to claim 9, wherein the vertical load controller performs at least one of: decreases a load applied to a wheel having a smallest tire load factor; and increases a load applied to a wheel having a largest tire load factor.

* * * * *